No. 711,441. Patented Oct. 14, 1902.
A. L. RIKER.
MOTOR VEHICLE FRAME.
(Application filed July 19, 1902.)
(No Model.) 3 Sheets—Sheet 1.

No. 711,441. Patented Oct. 14, 1902.
A. L. RIKER.
MOTOR VEHICLE FRAME.
(Application filed July 19, 1902.)
(No Model.) 3 Sheets—Sheet 2.

Witnesses: Inventor:
Andrew L. Riker,
by
Atty.

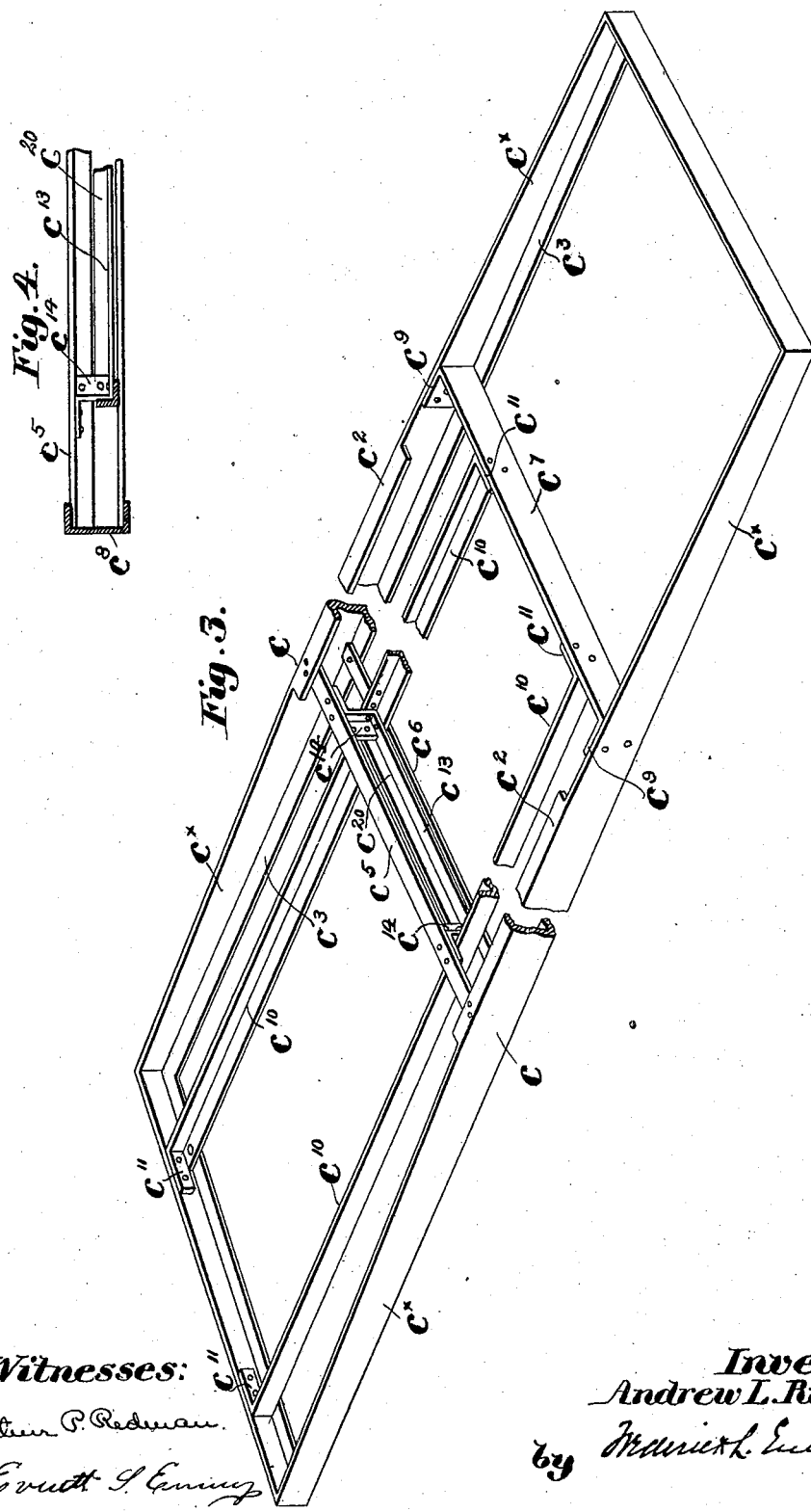

UNITED STATES PATENT OFFICE.

ANDREW L. RIKER, OF SHORTHILLS, NEW JERSEY, ASSIGNOR TO THE "LOCOMOBILE" COMPANY OF AMERICA, OF NEW YORK, N. Y., A CORPORATION OF WEST VIRGINIA.

MOTOR-VEHICLE FRAME.

SPECIFICATION forming part of Letters Patent No. 711,441, dated October 14, 1902.

Application filed July 19, 1902. Serial No. 116,214. (No model.)

*To all whom it may concern:*

Be it known that I, ANDREW L. RIKER, a citizen of the United States, residing at Shorthills, in the county of Essex and State of New Jersey, have invented an Improvement in Motor-Vehicle Frames, of which the following description, in connection with the accompanying drawings, is a specification, like letters on the drawings representing like parts.

This invention has for its object to provide a novel and improved frame for motor-vehicles.

While not particularly restricted thereto, my invention is, however, particularly adapted for use in connection with motor-vehicles wherein the body-frame is the only frame of the vehicle, the front and rear axles or wheels being connected to this frame, in contradistinction to a motor-vehicle wherein the running-gear has a frame of its own as well as the body, with the springs interposed between the two frames.

The aim of my invention is to provide a frame at once simple and economical in construction and possessing the greatest strength possible with a minimum weight of material.

The various features of my invention will best appear from a description of one embodiment thereof.

Figure 1:
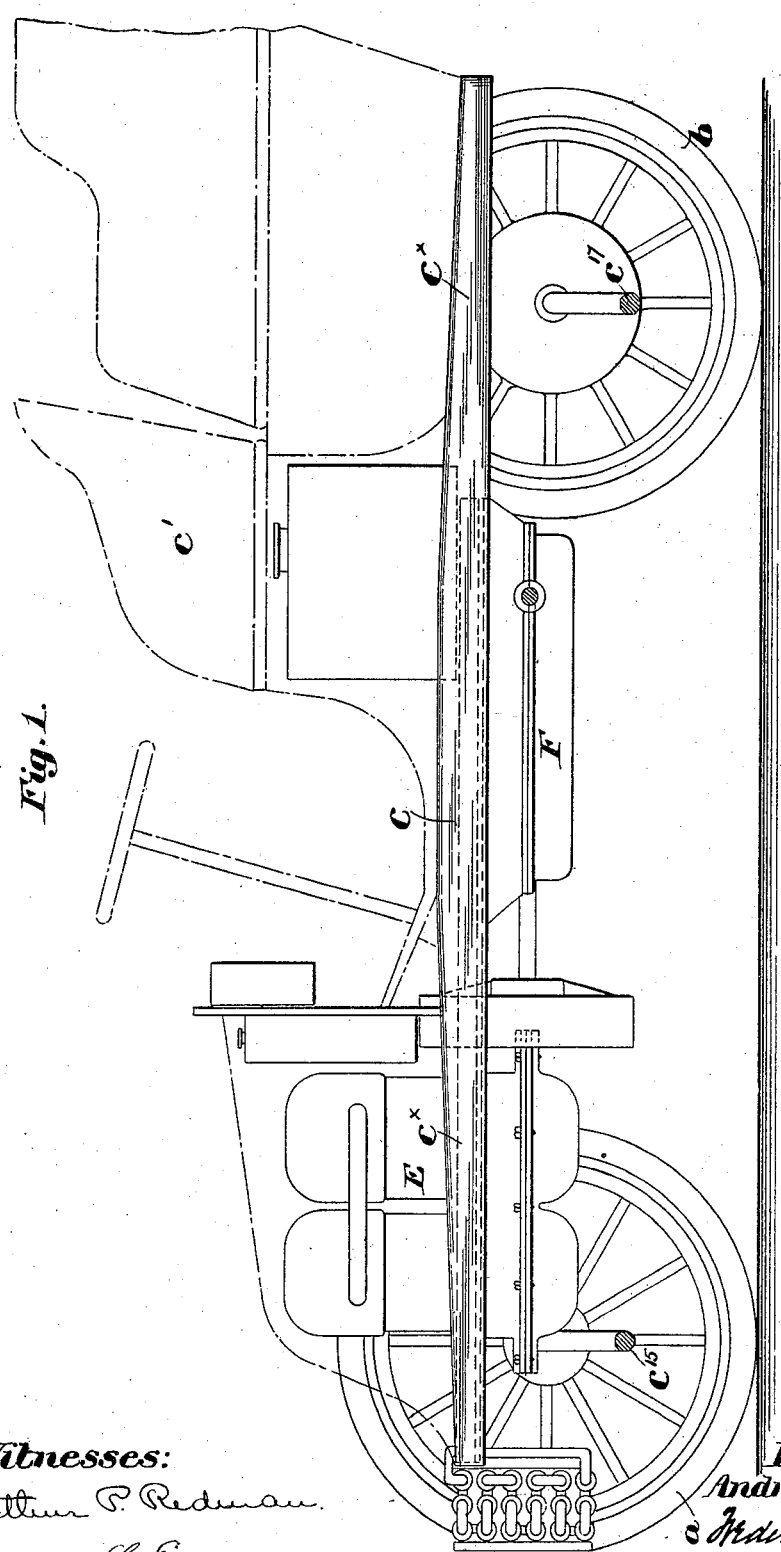
Figure 2:
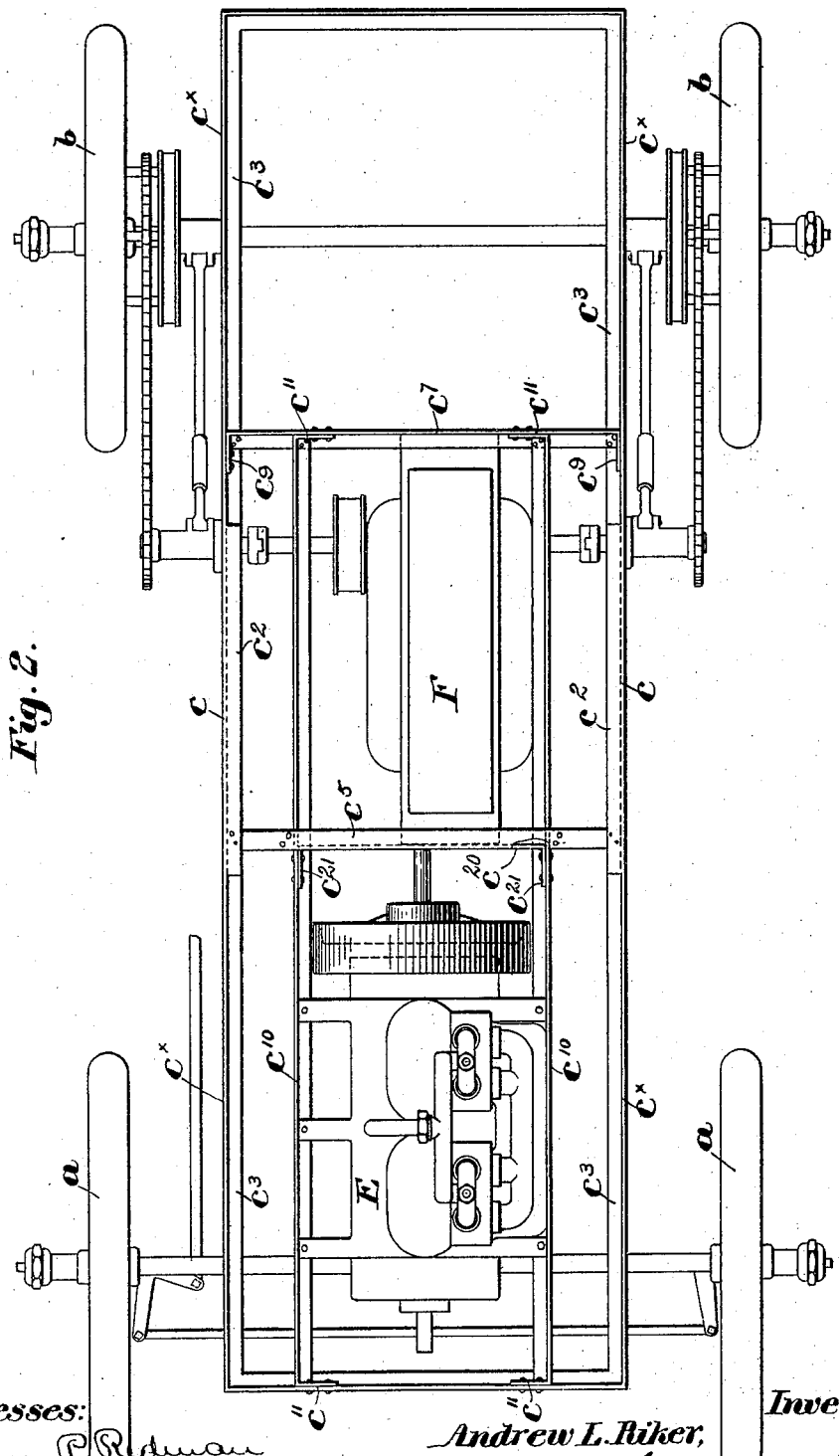

In the accompanying drawings, Figure 1, in side elevation, illustrates a typical motor-vehicle, in which is incorporated a frame made in accordance with my invention, the vehicle-body being indicated in dotted lines; Fig. 2, a top or plan view of Fig. 1 with the body removed; Fig. 3, an isometric view of the frame partially broken out at the middle; and Fig. 4, a sectional detail on the dotted line 4 4, Fig. 3.

In the particular embodiment of my invention selected for illustration herein and shown in the drawings, referring first to Figs. 2 and 3, the frame is constructed from metal, the side and end portions thereof being preferably formed from two like members bent at the corners and with their ends welded together at the ends of the frame. These members may conveniently be ordinary channels of sufficient depth at $c\ c$ to give the required stability between the points of support of the frame and where the latter is called upon to sustain the greatest weight. This is ordinarily about midway the length of the frame and midway between its two points of support at the front and rear, respectively. In the drawings the full depth and formation of the channel $c$ is extended for a distance approximately one-quarter of the length of the frame and at or about the middle thereof, where the principal weight of the occupant of the machine is carried in the front seat $c'$ and also that of the transmission-gear F, usually arranged in the vicinity of the said seat. From the full middle section $c$ the side bars of the frame are tapered gradually toward the ends thereof, because approaching the ends there is less and less requirement for depth, owing to the closer proximity to the points of support. The tapering portions are indicated in the drawings at $c^\times c^\times$ and are preferably formed by cutting away the top flange $c^2$ of the channel-iron gradually toward its ends, but leaving intact the bottom flange $c^3$ thereof, so as to preserve throughout the entire length of the side bars of the frame a proper degree of stability against lateral vibration or flexure. There is thus provided in effect a continuous vertical plate-frame extending completely around the vehicle, with each of the side and end lengths of such frame stiffened laterally by the bottom flange $c^3$ and with a top flange $c^2$ also for lateral stiffening at the middle portion of the frame and along the portion of the greatest depth thereof. The reason for this is obvious, since the greater the depth of the side plate the greater the necessity for restraining it from lateral flexure in order to obtain full benefit possible from that depth.

I have provided the frame with cross members $c^5$, $c^6$, and $c^7$, the members $c^5$ and $c^6$ being arranged one vertically over the other and suitably secured at their ends to the side members $c$ of the frame. The said members $c^5\ c^6$ are shown secured thereto by riveting their ends respectively to the top and bottom flanges of the side members $c\ c$. The cross member $c^7$ is secured in a manner similar to the cross-bar $c^6$ by overturning the ends of its vertical flange at $c^9$ and riveting the said overturned ends to the vertical portions of the side frames at $c'$. Between the cross member $c^7$ and the front end member of the frame there are arranged two longitudinal angle-iron supporting members $c^{10}$, secured at their ends also by turning over the vertical flanges thereof and riveting the same as well as their horizontal flanges directly to the said cross member and front end member, as shown in Fig. 3. These longitudinal supporting members $c^{10}$ pass between the top and bottom cross members $c^5$ and $c^6$ and rest upon the latter, to which they are secured. The longitudinal supporting members are stiffened against inward movement by a strap-like member $c^{13}$, resting upon the inturned bottom flanges of the said supporting members and with its ends turned abruptly to meet the top member $c^5$ and again turned outward and riveted thereto. The said longitudinal supporting members are further stiffened against lateral vibration or movement by a second strap-like member $c^{20}$, set one dge and with its ends bent forward at right angles and secured at $c^{21}$, Fig. 2, to the said supporting members. Strut-plates $c^{14}$, interposed between the top cross member $c^5$ and the stiffening member $c^{20}$, are riveted to each and further stiffen the structure. There is thus provided a frame which by reason of its greater depth in the vicinity of the middle portions of the lengths of the side members, especially when reinforced with the inturned top and bottom flanges, will sustain the required weight without "hogging." Yet by diminishing this vertical depth of the side frame members gradually from the middle portion thereof toward their ends superfluous weight is dispensed with in just the proportion in which by reason of the nearing proximity to the points of support the necessity for depth decreases. Furthermore, near the middle of the machine, where the frame depth is greatest and where the tendency to lateral vibration is greatest, the horizontal top and bottom flanges successfully resist such tendency; but from the middle toward the ends, where the tendency to lateral vibration is largely eliminated, the top flanges are omitted, the bottom flanges alone being relied upon.

By providing a frame the outer member of which is practically a single integral member great strength is provided, coupled with sufficient flexibility to enable the vehicle to adapt itself to a certain degree of wind as may be necessary to meet inequalities in the road. The longitudinal supporting members $c^{10}$ add to the stability of the frame and at the same time furnish convenient supports for the engine E, usually placed near the front of the frame, and for the transmission gear or mechanism F, usually placed near the middle of the length of the frame, and the cross members $c^5$, $c^6$, and $c^7$ furnish the further necessary elements required to give the frame a box-like stiff construction with sufficient provision for the wind or flexibility.

In Fig. 1 I have indicated in outline the various parts of a typical motor-vehicle as they might be arranged upon a frame of my invention, showing how the engine, even though of great weight, when secured near the front axle $c^{15}$ and the front wheels $a$ requires less depth of frame member at the side to carry its weight than is required near the middle of the vehicle at a point remote from either point of support. Similarly a "tonneau-seat" when applied at the rear of the vehicle is positioned almost directly over the rear axle $c^{17}$ and rear wheels $b$, and consequently requires less depth of frame at the sides thereof to sustain its weight. Midway between these two points of support, where the weight of the persons riding in the seat $c'$ and the transmission-gear, &c., are located, is the greatest depth combined with the greatest lateral stiffness against vibration. By increasing the depth of the side member of the frame near the middle thereof I eliminate all liability of the frames buckling should the front wheels meet any serious obstruction in the roadway.

My invention is not limited to the particular details of construction here disclosed, for the same may be varied without departing from the spirit and scope of my invention.

I claim—

1. A frame for motor-vehicles, including angle-iron side members tapering in depth or height from at or near the middle thereof toward the ends.

2. A frame for motor-vehicles including angle-iron side members and connecting angle-iron end members integrally united thereto, said side members tapering in depth or height from at or near the middle toward the ends thereof.

3. A frame for motor-vehicles, the side members of which have intermediate channel portions with angle-section end portions extending therefrom to the ends thereof.

4. A frame for motor-vehicles, the side members of which have channel formations at intermediate portions thereof only.

5. A motor-vehicle frame, the side members of which have straight channel-iron intermediate portions with tapering angle-iron end portions.

6. A frame for motor-vehicles comprising integral side and end members, the intermediate portions of the side members being channel-shaped in cross-section, the remaining portions being angular.

7. A motor-vehicle frame comprising side and end members, a cross member located rearward of the middle of the length of the frame, supporting members interposed between the same and the front end member, and one or more additional cross members intermediate the lengths of said supporting members and secured thereto.

8. A frame comprising side and end members said side members having respectively a channel formation intermediate their ends, the remaining portions of said side members and the end members being angular in cross-section, an angular cross member, angular supporting members between the same and one of the end members, and one or more additional cross members intermediate the ends of said supporting members.

9. A frame for motor-vehicles comprising side and end members, a cross member, longitudinal supporting members between the latter and one of the end members, and additional cross members intermediate the ends of said supporting members and secured respectively above and below, to the said supporting members.

In testimony whereof I have signed my name to this specification in the presence of two subscribing witnesses.

ANDREW L. RIKER.

Witnesses:
FREDERICK L. EMERY,
ALBERT C. SCHULZ.